Figures 1, 2, 3, 4, 5, 6:
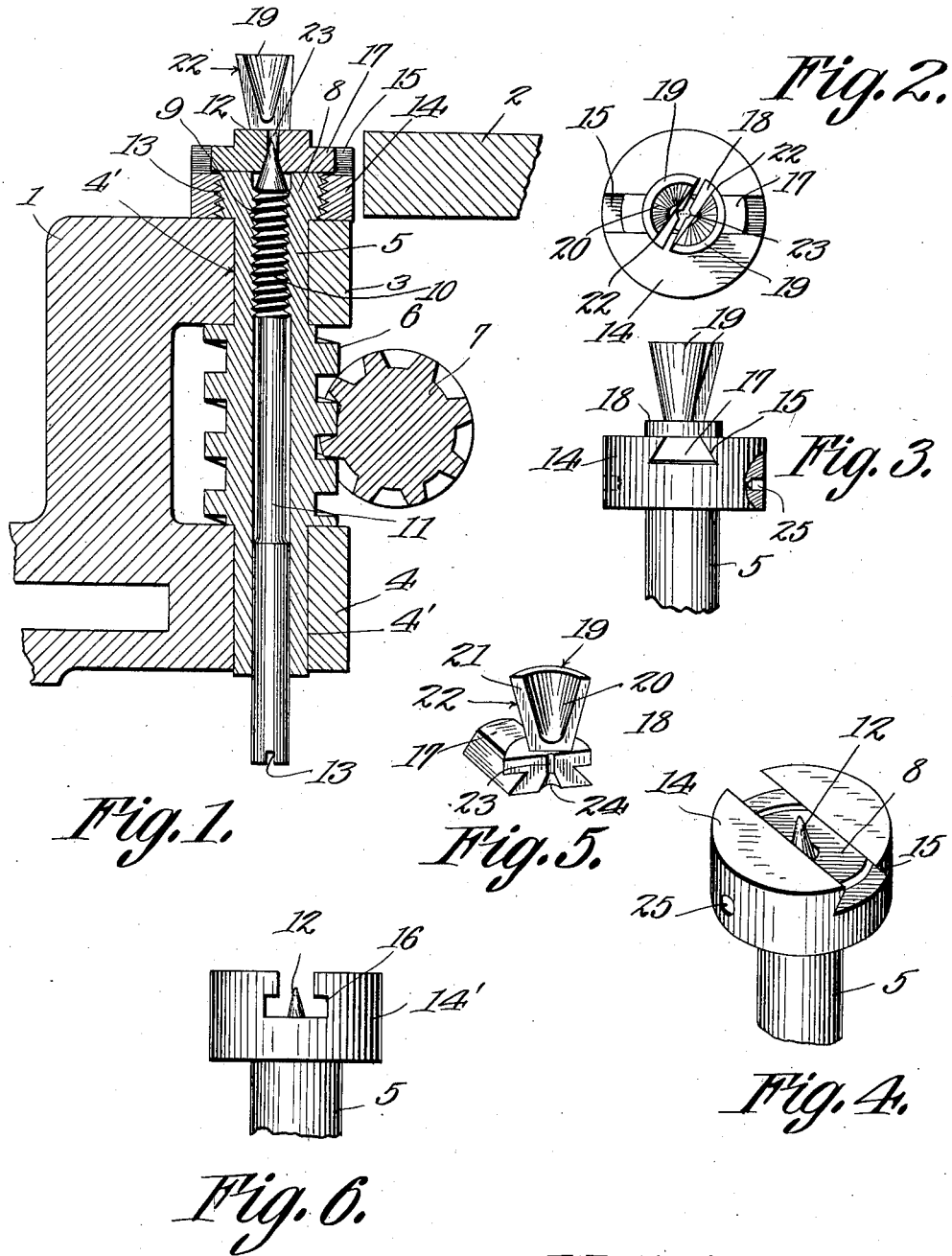

W. G. STROZIER.
DOVETAIL TOOL.
APPLICATION FILED NOV. 28, 1913.

1,095,041.

Patented Apr. 28, 1914.

Witnesses

W. G. Strozier
Inventor,
by C. A. Snow & Co.
Attorneys.

UNITED STATES PATENT OFFICE.

WEBSTER G. STROZIER, OF WASHINGTON, DISTRICT OF COLUMBIA, ASSIGNOR OF ONE-HALF TO CHARLES C. SINCLAIR, OF WASHINGTON, DISTRICT OF COLUMBIA.

DOVETAIL-TOOL.

1,095,041.  Specification of Letters Patent.  Patented Apr. 28, 1914.

Application filed November 28, 1913. Serial No. 803,598.

*To all whom it may concern:*

Be it known that I, WEBSTER G. STROZIER, a citizen of the United States, residing in Washington, District of Columbia, have invented a new and useful Dovetail-Tool, of which the following is a specification.

This invention relates to tools for cutting dovetail grooves, the same being more particularly designed for use in connection with machines such as disclosed, for example, in my copending application #763,136, filed by me on April 23, 1913.

One of the objects of the invention is to provide a rotary cutting tool adjustable to produce grooves of different widths, simple and efficient means being provided whereby the parts of the tool can be readily adjusted relative to each other and can be secured in adjusted position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—Figure 1 is a vertical section through a portion of a machine having the present improvements combined therewith, the cutting tool being shown in section. Fig. 2 is a plan view of the tool. Fig. 3 is a side elevation of a portion of the tool, a part thereof being in section. Fig. 4 is a perspective view of the head of the tool. Fig. 5 is a detail view of one of the cutters and its base. Fig. 6 is a side elevation of a modified form of head.

Referring to the figures by characters of reference 1 designates a block supported at one side of a table 2 and provided with upper and lower ears 3 and 4, respectively in which are formed alining bores 4′. A tubular spindle 5 is mounted for rotation within the bores 4′ and that portion of the spindle between the ears 3 and 4 is formed with a worm 6 adapted to be engaged and rotated by a worm shaft 7. One end of the spindle 5 is formed with an exteriorly screw threaded head 8 and that end portion of the spindle carrying the head, is interiorly screw threaded as shown at 9 so as to engage the threaded portion 10 of an adjusting stem 11. This stem is mounted for rotation within the spindle 5 and one end of the stem is provided with a conical nipple or spreading element 12 while the other end may be provided with a kerf 13 or any other suitable means whereby the stem can be rotated relative to the spindle 5 by means of a suitable tool.

The threaded head 8 of the spindle is adapted to screw into a threaded bore 13 formed within the holding block 14 of the cutter. This block is preferably provided with a dovetail groove 15 extending diametrically within the outer face thereof although if preferred, and as shown in Fig. 6; a T-shaped groove 16 may be provided within the holding block 14′ which is otherwise similar to the block 14.

Slidably mounted within the groove 15 are oppositely disposed similar members each consisting of a base 17 which is dovetailed when used in connection with a groove such as shown at 15 but which can be rectangular if it is to be used in connection with a groove such as shown at 16. The inner ends of the bases 17 are cut off obliquely and are parallel with each other, these inner end portions supporting semi-circular bosses 18. From each of these bosses extends one of the cutting members 19. Each of these cutting members is substantially in the form of one half of an inverted cone frustum, the same having their inner faces hollowed out as shown at 20 so as to produce narrow faces 21 leading to the cutting edges 22. The flat inner faces of the cutting elements 19 are disposed in planes extending at acute angles to the obliquely disposed inner ends of the bases 17 and bosses 18 so that, when the two bosses are brought together, the elements 19 will be spaced apart but with their inner faces in parallel planes, as will be apparent by referring to Fig. 2. Furthermore the cutting elements are disposed slightly off center so that, when the two faces are brought together in the manner described, the cutting edge of each element 19 will project slightly outwardly beyond the opposed edge of the other cutting element. The manner in which the cutting elements are offset is clearly indicated in Fig. 1 wherein it will be seen that one edge of the element is more nearly vertical than the other or cutting edge. As a result of this arrangement the cutting edges of the two elements will always be in position to engage the work during the rotation of the tool.

Grooves 23 are formed in the straight edges of the bosses 18 at the centers thereof and merge into flared recesses 24 formed in the bases 17. Thus when the two bases are brought together, a substantially conical recess will be formed by the recesses 24, this recess being disposed directly opposite the point of the nipple or spreading element 12.

When it is desired to adjust the tool so as to produce a dovetail groove of a predetermined width, a suitable tool is placed within the recesses 25 formed in the periphery of the block 14 and said block is then rotated relative to the head 8 so as to partly unscrew therefrom. Thus the bases 17 will be lifted off of the head 8 and will be free to slide toward or from each other. The bases are then adjusted so that the greatest distance between the cutting edges of the two elements 19 will be equal to the greatest width of the dovetail groove to be cut, this adjustment of the bases being effected by turning the stem 11 so as to force the nipple 12 between the bases, as shown in Fig. 1. When the adjustment of the parts has been effected, the block 14 is screwed onto the head 8 so as to cause the bases 17 to bind upon the head, thereby being held against accidental displacement. During the rotation of the tool the work may be fed thereto from the table 2 and, obviously, a dovetail groove will be produced therein.

Importance is attached to the fact that by providing the threaded stem 11, a minute adjustment of the bases 17 can be effected and, by mounting the block 14 on a threaded head 8, the said head 8 will act as a jam nut and hold the cutting elements securely in the desired relation to each other.

What is claimed is:—

1. A tool for cutting dovetail grooves including a holding block having a diametrical groove, oppositely disposed cutting elements independently adjustable within the groove, each of said elements being substantially in the form of one half of an inverted cone frustum, and a spindle threaded into the block and constituting means for holding the cutting elements against relative movement.

2. A tool for cutting dovetail grooves including a holding block, oppositely disposed bases adjustable diametrically upon one face of the block, a cutting element extending from each base, said cutting elements being oppositely disposed and being in the form of one half of an inverted cone frustum, and a spindle adjustably mounted within the holding block and constituting means for frictionally engaging the bases to hold them against movement relative to each other and to the block.

3. A tool for cutting dovetail grooves, including a holding block, bases adjustable diametrically thereon, said bases being oppositely disposed, a cutting element carried by each base, a spindle screwed into the holding block and constituting means for frictionally engaging the bases to hold them against movement relative to each other and to the holding block, and a spreading element adjustably mounted in the spindle and engaging the bases.

4. A tool for cutting dovetail grooves, including a holding block, oppositely disposed bases adjustable diametrically upon the block, cutting elements carried by the respective bases, a spindle screwed into the holding block and adapted to frictionally engage the bases to hold them against movement relative to the block and to each other, and a threaded stem adjustably mounted in the spindle and having a tapered end constituting spreading means insertible between the bases.

In testimony that I claim the foregoing as my own, I have hereto affixed my signature in the presence of two witnesses.

WEBSTER G. STROZIER.

Witnesses:
 SELINA WILLSON,
 I. E. SIMPSON.

---

Copies of this patent may be obtained for five cents each, by addressing the "Commissioner of Patents, Washington, D. C."